US012626083B2

(12) United States Patent
Chang

(10) Patent No.: US 12,626,083 B2
(45) Date of Patent: May 12, 2026

(54) FIDUCIAL TAG STRUCTURE

(71) Applicant: HON HAI PRECISION INDUSTRY CO., LTD., New Taipei (TW)

(72) Inventor: Po-Chieh Chang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 18/940,655

(22) Filed: Nov. 7, 2024

(65) Prior Publication Data

US 2025/0328746 A1     Oct. 23, 2025

(30) Foreign Application Priority Data

Apr. 17, 2024     (CN) .......................... 202410463206.1

(51) Int. Cl.
*G06K 19/06*          (2006.01)
(52) U.S. Cl.
CPC .............................. *G06K 19/06037* (2013.01)
(58) Field of Classification Search
CPC ....... G06K 19/06009; G06K 19/06037; G06K 19/06046
See application file for complete search history.

(56) References Cited

U.S. PATENT DOCUMENTS

| | | | | |
|---|---|---|---|---|
| 10,032,384 | B1 * | 7/2018 | Boyd | ....................... G08G 5/22 |
| 2014/0132729 | A1 * | 5/2014 | Foulk | ..................... G06F 30/00 |
| | | | | 348/46 |
| 2020/0037943 | A1 * | 2/2020 | Chaja | ..................... G06F 3/011 |
| 2021/0174950 | A1 * | 6/2021 | Hu | ....................... A61B 17/846 |
| 2023/0064401 | A1 * | 3/2023 | Heinzle | ............... G05D 1/0251 |
| 2023/0325155 | A1 * | 10/2023 | Rodriguez-Velasquez | .................. |
| | | | | G06V 10/255 |
| | | | | 717/106 |

FOREIGN PATENT DOCUMENTS

CN          207503528 U          6/2018

OTHER PUBLICATIONS

Pablo Garcia-Ruiz et al. Fiducial Objects: Custom Design and Evaluation. Sensors 2023,23, 9649. https://doi.org/10.3390/s23249649. Licensee MDPI, Basel, Switzerland. Published: Dec. 6, 2023.

* cited by examiner

*Primary Examiner* — Laura A Gudorf
(74) *Attorney, Agent, or Firm* — ScienBiziP, P.C.

(57)          ABSTRACT
A fiducial tag structure includes a polyhedral structure and a plurality of fiducial tags. The polyhedral structure includes a plurality of surfaces that are non-coplanar. Each of the plurality of fiducial tags is formed on one of the plurality of surfaces, and each of the plurality of fiducial tags includes a two-dimensional pattern carrying code information.

8 Claims, 9 Drawing Sheets

100

100

10

20

10

11

20

23

232

236

234(234A)

FIDUCIAL TAG STRUCTURE

FIELD

The subject matter herein generally relates to a fiducial tag structure.

BACKGROUND

A fiducial tag is a special symbol used in computer vision. The fiducial tag has been used for attitude and position estimation of a camera mounted on a robot in three-dimensional space, thus enabling the robot to navigate and locate in unknown environments. In addition, in three-dimensional space, a LiDAR system is employed to emit laser light towards the fiducial tag. The laser light reflected by the fiducial tag propagates back and is subsequently received by the LiDAR system. Based on the reflected laser light, the LiDAR system can detect and decode the information within the fiducial tag. This information is then utilized by the robot, equipped with a LiDAR sensor, for attitude and position estimation, thereby aiding in localization. However, the LiDAR system cannot decode the laser light reflected by the fiducial tag when the fiducial tag is placed at a specific angle, thereby rendering it unable to obtain information (such as global coordinates) from the fiducial tag for improving localization in three-dimensional space.

Therefore, there is room for improvement within the art.

BRIEF DESCRIPTION OF THE DRAWINGS

Implementations of the present disclosure will now be described, by way of embodiment, with reference to the attached figures, wherein.

DETAILED DESCRIPTION

Figure 1:
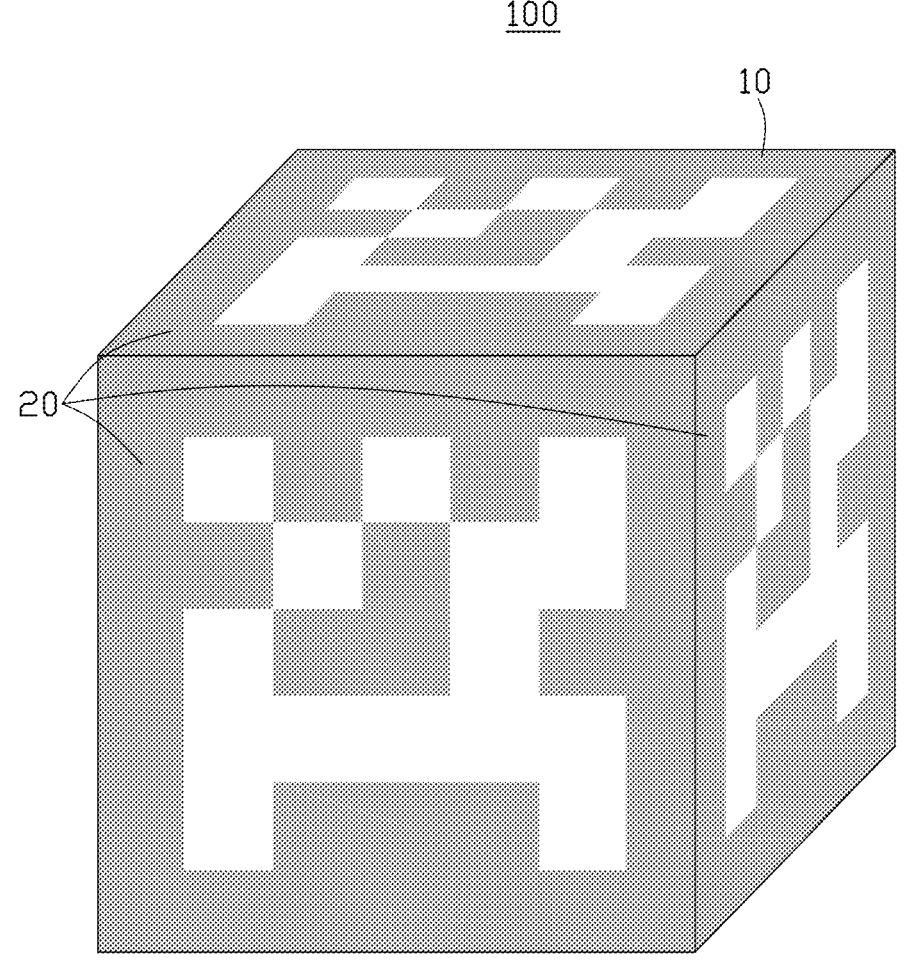
FIG. 1 shows a fiducial tag structure according to a first embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail to avoid obscuring the relevant feature being described. Also, the description should not be considered as limiting the scope of the embodiments described herein. The drawings are not necessarily to scale, and the proportions of certain parts have been exaggerated to better illustrate details and features of the present disclosure.

Several definitions that apply throughout this disclosure will now be presented.

The term "comprising," when utilized, means "including, but not necessarily limited to"; it specifically indicates open-ended inclusion or membership in the so-described combination, group, series, and the like.

"Above" means one layer is on top of another layer. In one example, it means one layer is situated directly on top of another layer. In another example, it means one layer is situated over the second layer directly or indirectly with more layers or spacers in between.

When a feature or element is herein referred to as being "on" another feature or element, it can be directly on the other feature or element or intervening features and/or elements may also be present. It will also be understood that, when a feature or element is referred to as being "connected", "attached" or "coupled" to another feature or element, it can be directly connected, attached, or coupled to the other feature or element or an intervening features or elements may be present.

As shown in FIG. 1, a fiducial tag structure 100 provided in the present embodiment is applied to a LiDAR system. The fiducial tag structure 100 includes a plurality of fiducial tags 20 carrying code information. Each fiducial tag 20 can be read and recognized by the LiDAR system to estimate its position and attitude of the LiDAR in three-dimensional space. The following will explain the fiducial tag structure 100 of the present disclosure through embodiments.

First Embodiment

Figure 2:
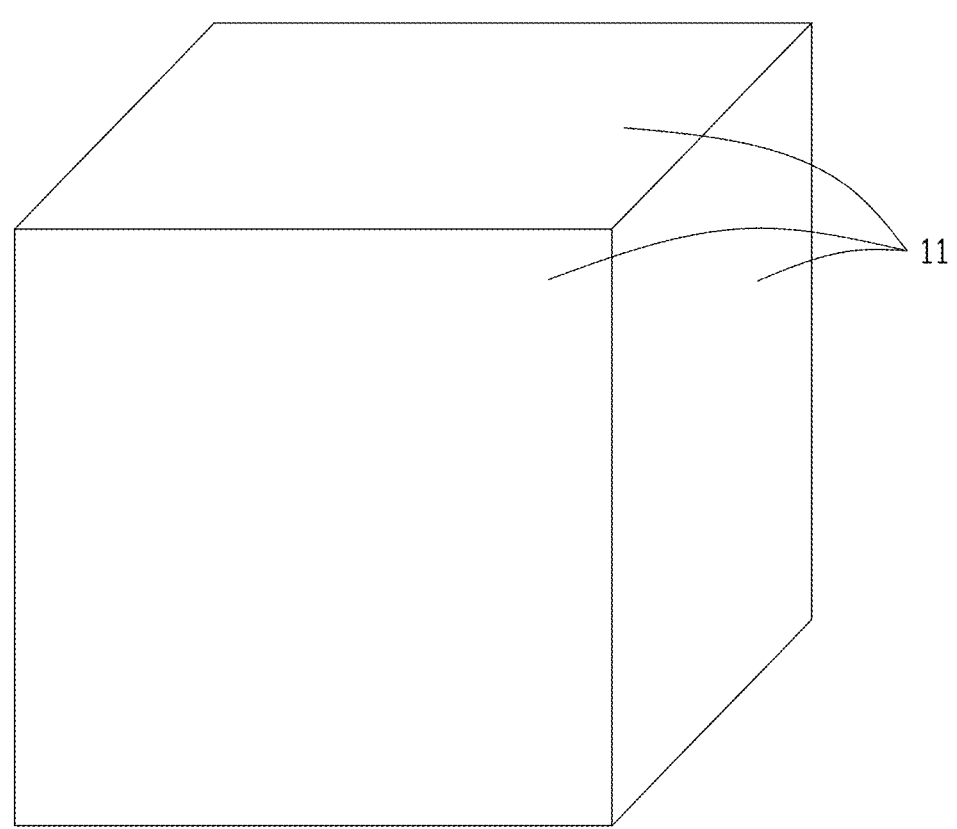
FIG. 2 shows a polyhedral structure in FIG. 1.
Figure 3:
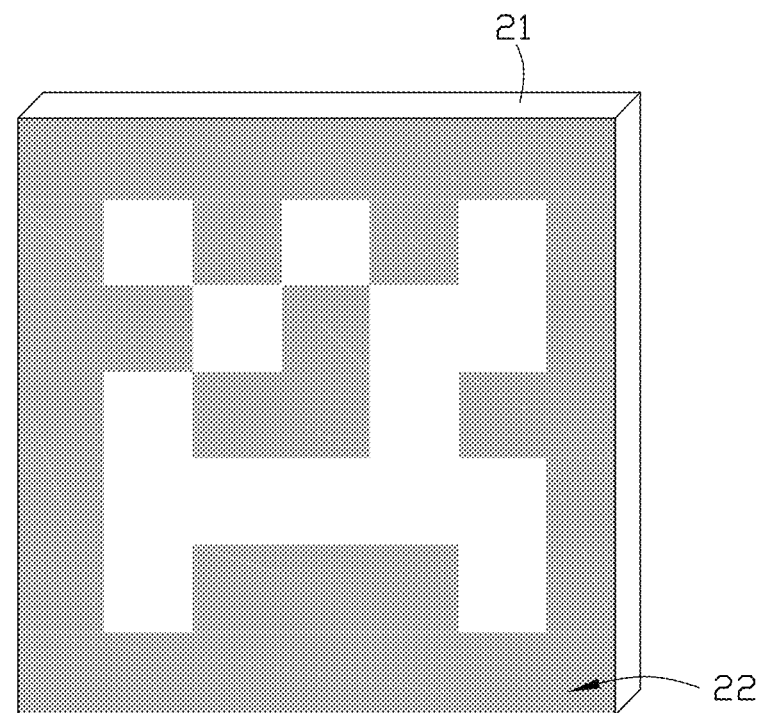
FIG. 3 shows a fiducial tag in FIG. 1.

As shown in FIG. 1, FIG. 2 and FIG. 3, the fiducial tag structure 100 of the present embodiment includes a polyhedral structure 10 and the fiducial tags 20. The polyhedral structure 10 includes a plurality of non-coplanar surfaces 11. Each fiducial tag 20 is formed on one of the surfaces 11, and each fiducial tag 20 includes a two-dimensional pattern 22 carrying code information.

The polyhedral structure 10 is a polyhedron and includes the surfaces 11. Specifically, in this embodiment, the polyhedral structure 10 is a regular hexahedron. However, in other embodiments, the polyhedral structure 10 may be a regular tetrahedron or an octahedron. In this embodiment, each surface 11 is equipped with one fiducial tag 20, and the fiducial tags 20 feature the same two-dimensional pattern 22. In other embodiments, fiducial tags 20 with the same two-dimensional pattern 22 are only set on some of the surfaces 11.

As shown in FIG. 3, each fiducial tag 20 also includes a base layer 21, with the two-dimensional pattern 22 formed on it. The base layer 21 is fixed on one corresponding surface 11 of the polyhedral structure 10 by pasting. The two-dimensional pattern 22 is situated on the side of the base layer 21 that is away from the corresponding surface 11. Essentially, the base layer 21 is pasted onto the corresponding surface 11 to make the two-dimensional pattern 22 visible.

In this embodiment, the base layer 21 is made of waterproof paper, and the two-dimensional patterns 22 can be formed on the base layer 21 through methods such as paint printing, spraying, and others. In other embodiments, the base layer 21 is not included in the fiducial tag 20, and the two-dimensional patterns 22 are directly drawn on the corresponding surface 11. The two-dimensional pattern 22 of the fiducial tag 20 is encoded by users through a computer according to usage needs, so that the code information is carried on the two-dimensional pattern 22. The code information carried by the two-dimensional pattern 22 can also be world coordinate information, personal identity information, or two-dimensional code pattern information.

In the fiducial tag structure 100 of this embodiment, each surface 11 of the polyhedral structure 10 is provided with the same fiducial tag 20. The laser light emitted by the LiDAR system transmits to the fiducial tag structure 100, which reflects the incoming laser light back to the LiDAR system. The LiDAR system receives the reflected laser light and decodes the code information from the two-dimensional pattern 22 of the fiducial tag 20. Since every surface 11 of the polyhedral structure 10 is formed with the fiducial tag 20, an angle between the fiducial tag 20 and a light path of the laser light from the LiDAR system is no longer limited. That is, regardless of an angle at which the laser light is emitted to the fiducial tag structure 100, the LiDAR system can receive the reflected laser light and decode all the code information of the two-dimensional pattern 22.

Second Embodiment

Figure 4:
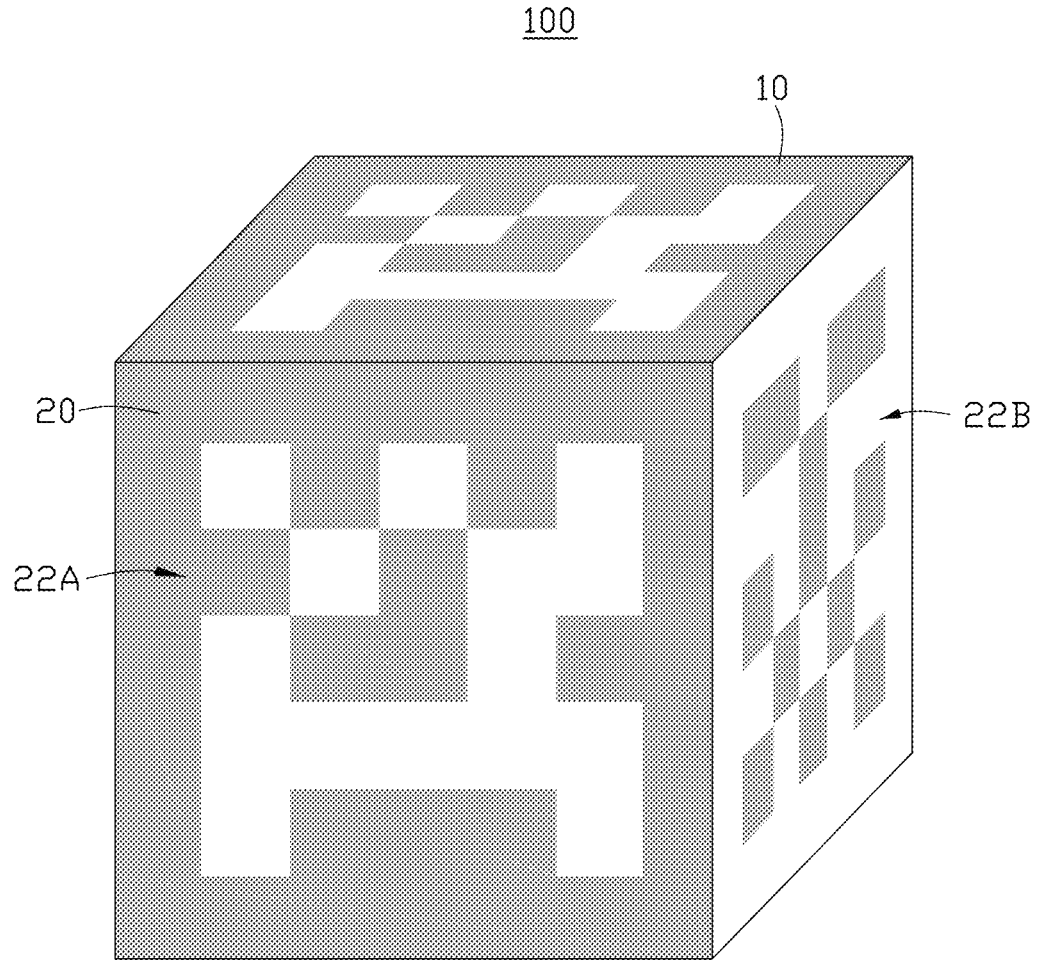
FIG. 4 shows the fiducial tag structure according to a second embodiment of the present disclosure.

As shown in FIG. 4, the fiducial tag structure 100 of this embodiment is similar to the fiducial tag structure 100 of the first embodiment. However, the fiducial tag structure 100 of the second embodiment differs in that at least two of the fiducial tags 20 on different surfaces 11 have different two-dimensional patterns 22. Specifically, the fiducial tag structure 100 of the second embodiment includes at least two types of fiducial tags 20, wherein one of the two types of fiducial tags 20 is on at least two surfaces 11 of the fiducial tag structure 100 for laser scanning, another one of the two types of fiducial tags 20 is on at least one surface 11 of the fiducial tag structure 100 for other purposes, such as direct viewing or scanning by people. In the fiducial tag structure 100 shown in FIG. 4, the two-dimensional pattern 22A differs from the two-dimensional pattern 22B, and the two-dimensional pattern 22A and the two-dimensional pattern 22B are on different surfaces. In the second embodiment, each surface 11 is formed with one type of the two types of fiducial tags 20. In other embodiments, partial of the surfaces 11 are formed with the fiducial tags 20.

In the second embodiment, at least two surfaces 11 of the polyhedral structure 10 are formed with different fiducial tags 20, making the fiducial tag structure 100 carry at least two different types of fiducial tags 20. One type of fiducial tag 20 can be scanned by the LiDAR system to obtain the code information of the two-dimensional pattern 22, while another type of fiducial tag 20 can be directly viewed by people (such as drivers, passengers, pedestrians in vehicles, etc.) or scanned by devices such as mobile phones to obtain the information carried by the corresponding two-dimensional pattern 22, thereby improving the usage efficiency of the fiducial tag structure 100.

Third Embodiment

Figure 5:
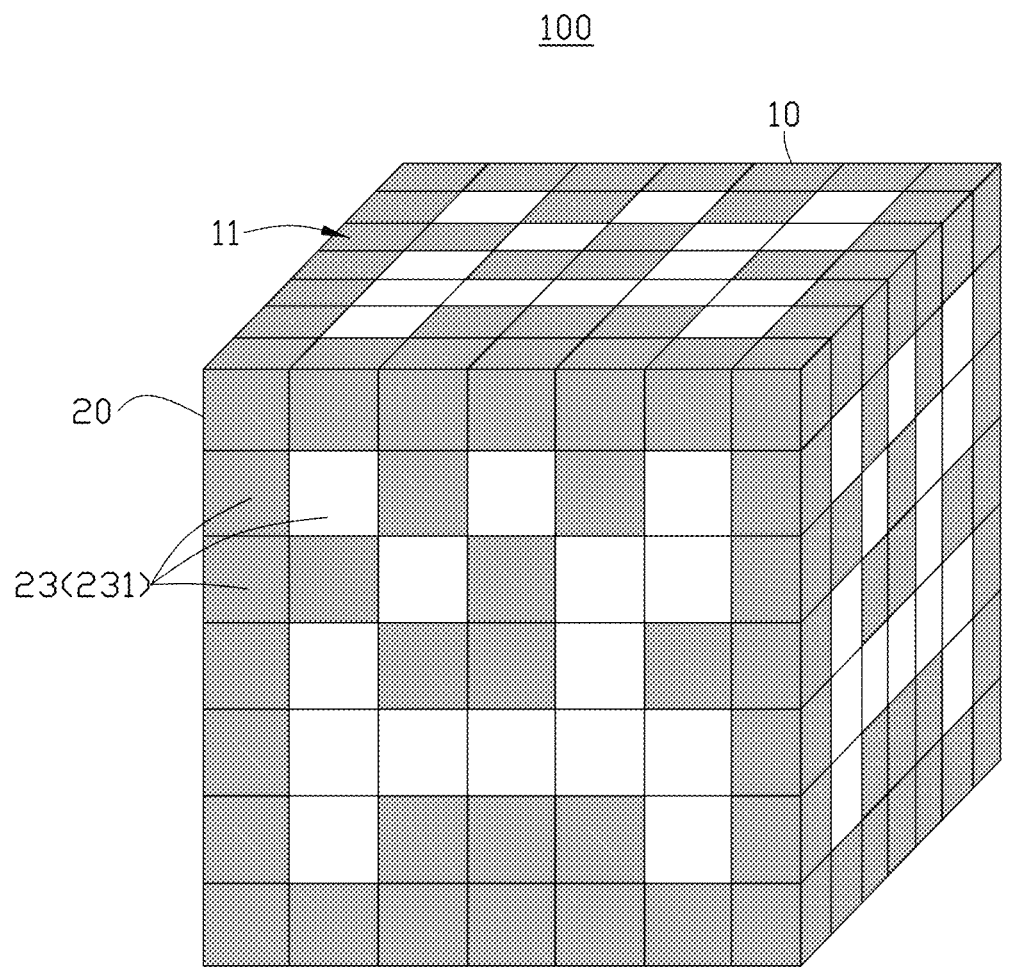
FIG. 5 shows the fiducial tag structure according to a third embodiment of the present disclosure.

As shown in FIG. 5, the fiducial tag structure 100 of the third embodiment is similar to the fiducial tag structure 100 of the first embodiment. However, the fiducial tag structure 100 of the third embodiment differs from the fiducial tag structure 100 of the first embodiment in that the polyhedral structure 10 of the third embodiment includes a plurality of three-dimensional and rotatable pixel blocks 23.

Each surface 11 of the polyhedral structure 10 is composed of surfaces of multiple pixel blocks 23 that are on the same plane. Each fiducial tag 20 is formed on one surface 11. Each pixel block 23 includes a plurality of surfaces, wherein at least two of the surfaces are provided with pixels 231 carrying different code information. The pixels 231 carrying different code information are selectively visible (i.e. facing a direction away from the polyhedral structure 10 to expose the pixel 231). All visible pixels 231 on the same surface 11 of the polyhedral structure 10 form a complete two-dimensional pattern 22 of the fiducial tag 20. The visible pixels 231 can be switched by rotating the pixel block 23, thereby changing the two-dimensional pattern 22.

Each pixel 231 may include a sub-base layer (not shown) attached to the surface of the pixel block 23 and a pixel 231 formed on the sub-base layer (not shown). In at least one embodiment, the pixel 231 may also be directly drawn on the surface of the pixel block 23.

Figure 6:
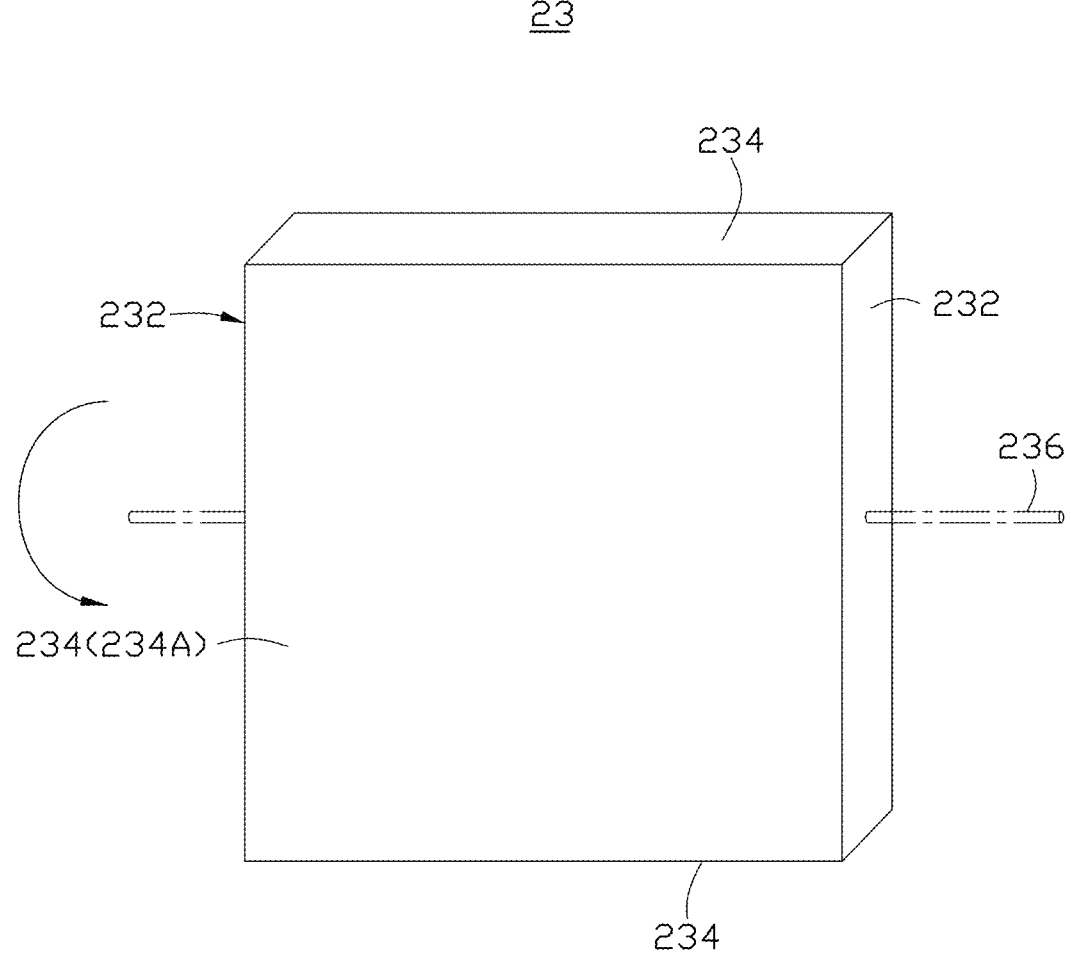
FIG. 6 shows a pixel block in FIG. 5.

As shown in FIG. 6, each pixel block 23 includes two parallel end faces 232 and a plurality of side faces 234 between the two end faces 232. Each side face 234 connects the two end faces and is provided with the pixel 231. Each pixel block 23 also includes a rotation axle 236 perpendicular to the two end faces 232 of the pixel block 23. The rotation axle 236 extends from the center of one end face 232 to the center of the other end face 232. Each pixel block 23 is rotatable around the rotation axle 236 to switch pixels 231 on different side faces 234 to be visible.

Figure 7:
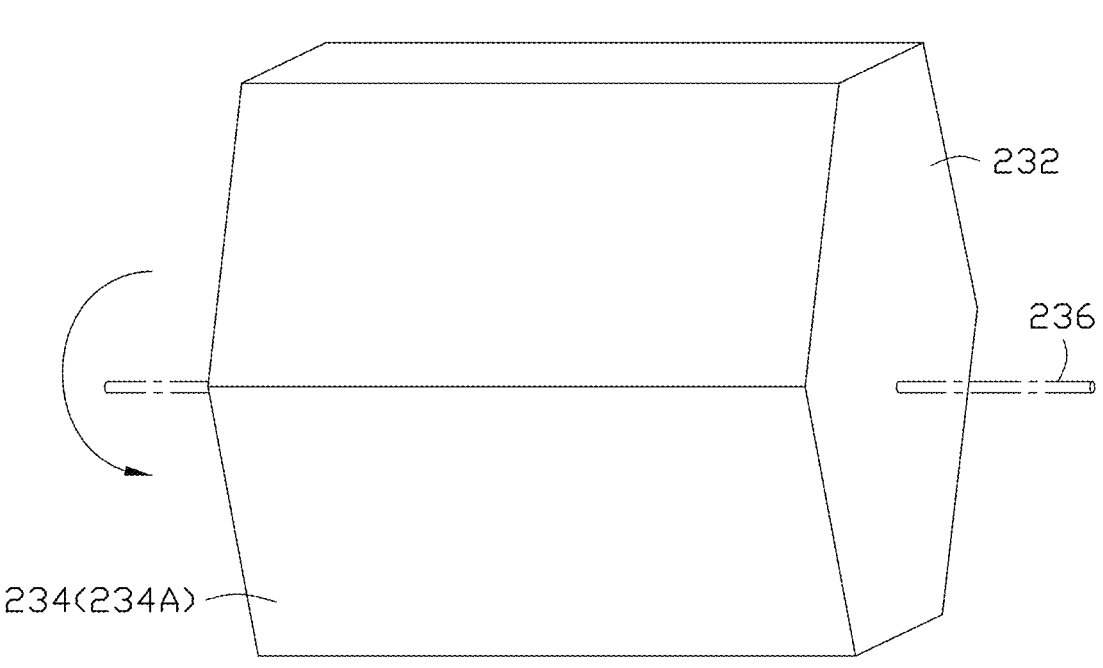
FIG. 7 shows a pixel block according to at least one embodiment of the present disclosure.

In at least one embodiment of the present disclosure, each pixel block 23 is a cuboid. Each pixel block 23 includes two first sides 234A that are square and parallel to each other. Each first side 234A is provided with the pixel 231. When the pixel block 23 rotates around the rotation axle 236, the pixel 231 on the visible side of the fiducial tag 20 changes, resulting in a change in the code information carried by the two-dimensional pattern 22 on the visible side of the fiducial tag 20. In this embodiment, "visible" refers to being visible to the human eye or scanned by any machine. In other embodiments, the pixel block 23 may have other shapes. For example, in at least one embodiment, the pixel block 23 may be a hexagonal prism shown in FIG. 7, wherein the rotation axle 236 is between the two end faces 232 of the pixel block 23, and at least one of the side faces 234 between the two end faces 232 is provided with the pixel 231.

In the fiducial tag structure 100 of the third embodiment, the fiducial tag 20 includes a plurality of pixel blocks 23, and at least two surfaces of each pixel block 23 are provided with the pixels 231 carrying different code information. Each pixel block 23 includes a rotation axle 236 inside, and each pixel block 23 is rotatable around the rotation axle 236 to switch pixels 231 on the visible side of the fiducial tag 20. When the pixel 231 on the visible side of the fiducial tag 20 changes, the code information carried by the two-dimensional pattern 22 composed of multiple pixels 231 changes. Users can timely replace the content on the fiducial tag structure 100 according to different usage scenarios or needs, so that the fiducial tag structure 100 can be provided with multiple different fiducial tags 20, thereby improving the utilization rate of the fiducial tag structure 100.

Figure 8:
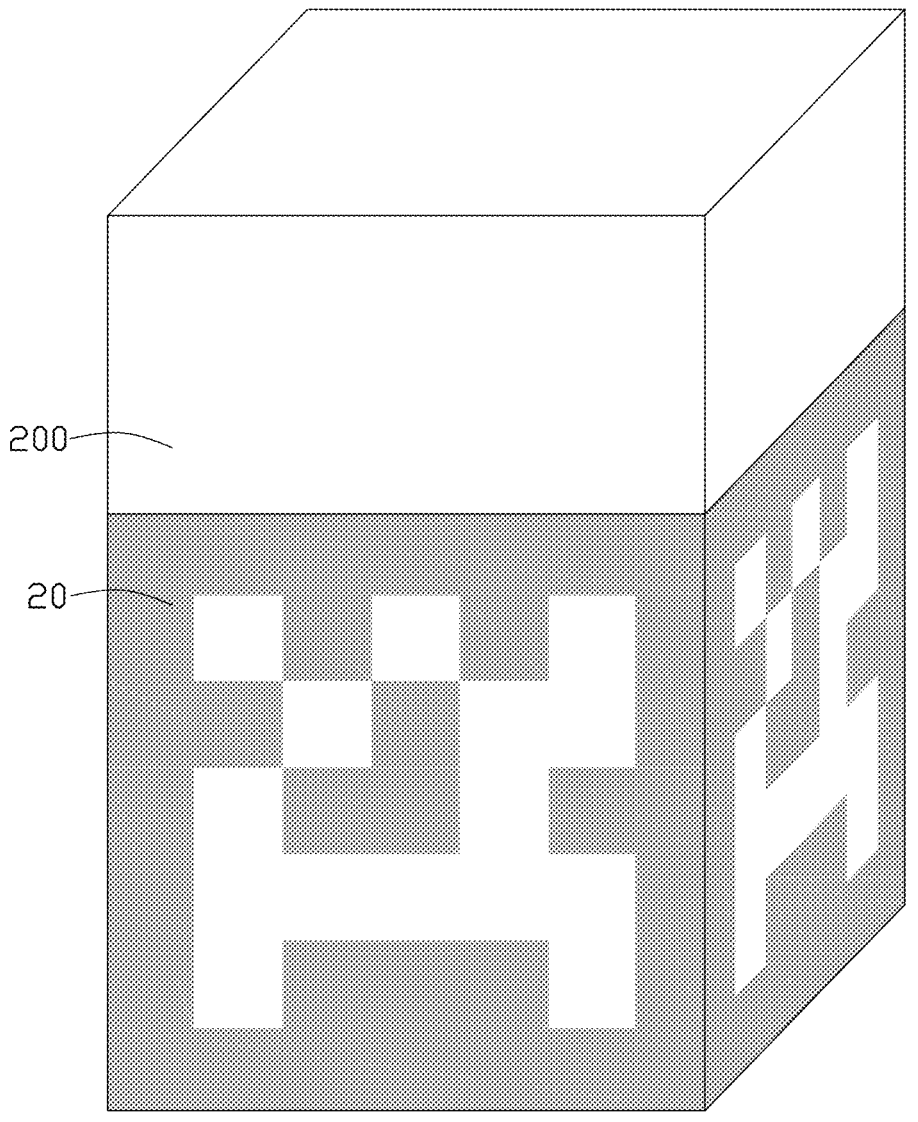
FIG. 8 shows a fiducial tag structure fixed on a carrying device.

As shown in FIG. 8, in at least one embodiment, the polyhedral structure 10 is replaced by a carrying device 200, and the fiducial tags 20 are directly fixed on the carrying device 200, thereby saving a cost of making the polyhedral structure 10. The carrying device 200 can be a substation on the roadside, or a traffic light that directs road traffic.

Figure 9:
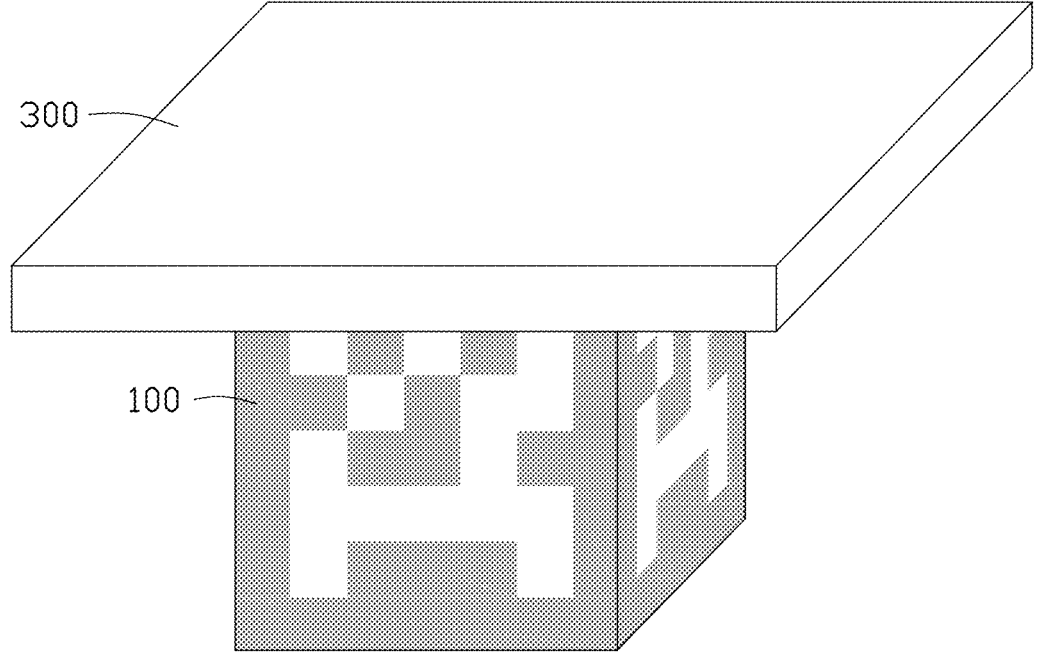
FIG. 9 shows a fiducial tag structure including a covering device.

As shown in FIG. 9, in at least one embodiment, a covering device 300 is placed at a top of the fiducial tag structure 100. The covering device 300 is used to prevent the fiducial tag 20 from falling off or prevent the two-dimensional pattern 22 from being partially obscured by dirt, thereby affecting the success rate of laser (the signal light) in identifying the fiducial tag 20.

The fiducial tag structure 100 of this disclosure can be applied to road traffic environments. For example, the fiducial tag structure 100 may be fixed on flower beds, substations, or traffic lights on the roadside. The fiducial tag structure 100 may also be placed separately as an indicator sign.

The fiducial tag structure 100 can be recognized by the LiDAR system. Vehicles driving on the road including the LiDAR system can emit laser light to the fiducial tag structure 100, which reflects the laser light back to the LiDAR system. The LiDAR system can transmit point clouds generated according to the laser light reflected by the fiducial tag structure 100 to the vehicle's processing system. The processing system of the vehicle estimates the position of the vehicle on the road based on the code information, such as global coordinates, thereby navigating and positioning the vehicle in an unknown environment.

In summary, the embodiments of this disclosure have the following beneficial effects:

In the fiducial tag structure 100 described above, if each surface 11 of the polyhedral structure 10 is provided with the same fiducial tag 20, the fiducial tag structure 100 can reflect laser light carrying the code information regardless of the angle at which the LiDAR system emits the laser light to the polyhedral structure 10. This ensures that the LiDAR system accurately recognizes the code information of the fiducial tag 20.

Compared to prior art, the LiDAR system is no longer constrained by the angle between the fiducial tag 20 and the light path of the laser light emitted from the LiDAR system. The LiDAR system can receive reflected laser light carrying the code information of the two-dimensional pattern 22 from any direction.

If at least two surfaces 11 of the polyhedral structure 10 are provided with different fiducial tags 20 (that is, the fiducial tag structure 100 includes at least two different types of fiducial tags 20), the fiducial tag structure 100 can be applied to different usage scenarios, which can save the cost of making the polyhedral structure 10 and improve the usage efficiency of the fiducial tag structure 100.

The polyhedral structure 10 of the fiducial tag structure 100 can also be composed of multiple pixel blocks 23, each of which is embedded with the rotation axle 236. Rotating the pixel blocks 23 around the rotation axle 236 switches the visible pixels 231, thereby changing the code information carried by the two-dimensional pattern 22 on the visible side of the fiducial tag 20. Users can switch the visible pixels 231 according to different usage scenarios or needs, thereby changing the code information of the two-dimensional pattern 22 on the visible side of the fiducial tag 20 of the fiducial tag structure 100. That is, the fiducial tag structure 100 includes multiple different fiducial tags 20, which improves the utilization rate of the fiducial tag structure 100.

Finally, it should be noted that the above embodiments are only used to illustrate the technical solution of the present application and not to limit the present application. Although the present application has been described in detail with reference to preferred embodiments, one ordinary skill in the art should understand that the technical solution of the present application can be modified or equivalently replaced without departing from the spirit and scope of the technical solution of the present application.

What is claimed is:

1. A fiducial tag structure comprising:
a polyhedral structure comprising a plurality of surfaces, wherein the plurality of surface is-non-coplanar; and
a plurality of fiducial tags, each of the plurality of fiducial tags formed on a corresponding surface of the plurality of surfaces, and each of the plurality of fiducial tags comprising a two-dimensional pattern carrying code information;
wherein the two-dimensional pattern is formed by paint printing, spraying or drawing, each of the plurality of fiducial tags is readable and recognizable by a Light Detection and Ranging (LiDAR) system thereby generating a position and an attitude of the LiDAR system;
the polyhedral structure further comprises a plurality of pixel blocks, each of the plurality of pixel blocks is three-dimensional and rotatable, and the two-dimensional pattern changes as at least one of the plurality of pixel blocks rotates.

2. The fiducial tag structure according to claim 1, wherein each of the plurality of pixel blocks comprises at least two surfaces comprising pixels carrying different code information;
the pixels are selectively visible, by rotating at least one of the plurality of pixel blocks, the pixels carrying different code information are selected to be visible, thereby changing the two-dimensional pattern.

3. The fiducial tag structure according to claim 2, wherein each of the surfaces of the polyhedral structure is composed of surfaces of a portion of the plurality of pixel blocks on a same plane; and
the pixels selected to be visible on the same surface of the polyhedral structure collectively form one two-dimensional pattern of one of the plurality of fiducial tags.

4. The fiducial tag structure according to claim 1, wherein each of the plurality of pixel blocks comprises two end surfaces parallel to each other and a plurality of side faces between the two end faces, at least one of the plurality of side faces is provided with the pixel; and
each of the plurality of pixel blocks comprises a rotation axle perpendicular to the two end faces, allowing each of the plurality of pixel blocks to rotate around the rotation axle.

5. The fiducial tag structure according to claim 4, wherein the rotation axle extends from a center of one of the two end faces to a center of another one of the two end faces.

6. The fiducial tag structure according to claim 1, wherein the two end faces are in a squared shape.

7. The fiducial tag structure according to claim 1, wherein each of the plurality of pixel blocks is a cuboid.

8. The fiducial tag structure according to claim 1, wherein each of the plurality of pixel blocks is a hexagonal prism.

* * * * *